United States Patent [19]

Kinoshita et al.

[11] Patent Number: 4,809,661
[45] Date of Patent: Mar. 7, 1989

[54] IGNITION SYSTEM FOR INTERNAL COMBUSTION ENGINE

[75] Inventors: Atsufumi Kinoshita, Suntou; Hiroshi Tamai, Numazu, both of Japan

[73] Assignee: Kokusan Denki Co., Ltd., Numazu, Japan

[21] Appl. No.: 182,948

[22] Filed: Apr. 18, 1988

[30] Foreign Application Priority Data

Apr. 22, 1987 [JP] Japan .................................. 62-97571

[51] Int. Cl.$^4$ ............................................. F02P 5/155
[52] U.S. Cl. ...................................... 123/418; 123/602
[58] Field of Search .................... 123/149 C, 335, 418, 123/599, 602, 651, 427

[56] References Cited

U.S. PATENT DOCUMENTS

| | | | |
|---|---|---|---|
| 4,142,490 | 3/1979 | Hosaka et al. | 123/418 |
| 4,237,835 | 12/1980 | Rabus et al. | 123/418 |
| 4,245,600 | 1/1981 | Katada | 123/418 X |
| 4,385,617 | 5/1983 | Nakata et al. | 123/418 X |
| 4,503,823 | 3/1985 | Shibukawa et al. | 123/418 |
| 4,516,554 | 5/1985 | Miura et al. | 123/418 |

FOREIGN PATENT DOCUMENTS 25968  2/1986  Japan .

Primary Examiner—Tony M. Argenbright
Attorney, Agent, or Firm—Pearne, Gordon, McCoy & Granger

[57] ABSTRACT

An ignition system for an internal combustion engine capable of carrying out operaton of an ignition position using a generating coil arranged in a magneto as a signal coil and without using an integrating circuit. For this purpose, in the ignition system, a trigger circuit for supplying a semiconductor switch with a trigger signal includes a delay rotation region setting circuit detecting that a rotational speed of an engine enters a delay rotation region to generate a delay region signal, a reference signal generating circuit for generating reference signals of different levels depending on the delay region signal, and a trigger signal generating circuit for comparing the output signal of the signal coil with the reference signal to generate a trigger signal.

4 Claims, 6 Drawing Sheets

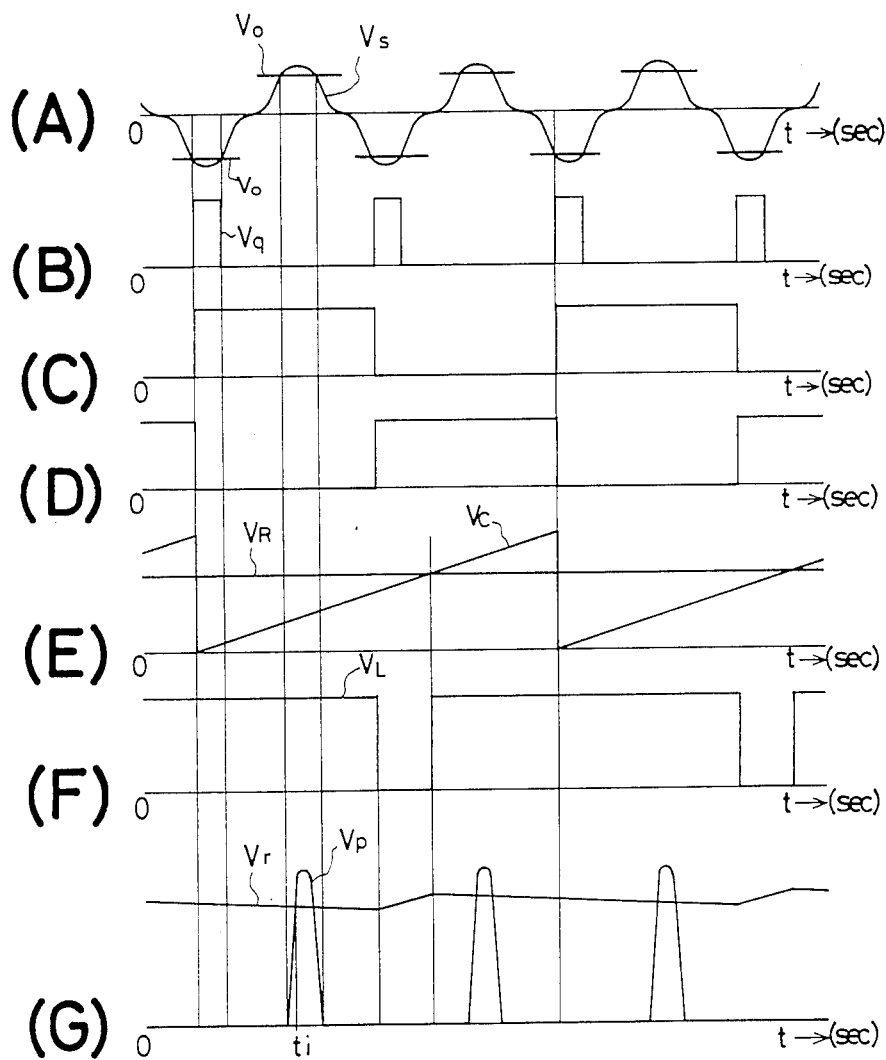

IGNITION SYSTEM FOR INTERNAL COMBUSTION ENGINE

BACKGROUND OF THE INVENTION

1. Field of the Invention

This invention relates to an ignition system for an internal combustion engine, and more particularly to an ignition system for an internal combustion engine which is adapted to control an ignition position of the engine depending on a rotational speed of the engine.

2. Description of the Prior Art

In order to prevent overspeed of an internal combustion engine, it is often required to delay an ignition position of the engine when a rotational speed of the engine reaches a high speed region. Also, in a two-cycle engine, in order to increase an output of the engine when the engine is rotating at a high speed, it is often carried out to delay its ignition position. For these purposes, it is required to construct an ignition system so that it may exhibit characteristics of causing the ignition position to be delayed when a rotational speed of the engine is in a low or middle rotational speed region and to be advanced when it reaches a high rotational speed region.

Recently, it is desired that an ignition system for an internal combustion engine controls an ignition position of the engine as accurately as possible. In order to meet the requirement, an ignition system of the electronic control type has been extensively used which is adapted to calculate an ignition position of an engine corresponding to a rotational speed of the engine by electronic operation. Such an ignition system is disclosed in Japanese Patent Application Laying-Open Publication No. 25968/1986, the disclosure of which is incorporated by reference. The conventional ignition system includes a signal coil for generating a maximum advanced position indicating signal and a minimum advanced position indicating signal, an integrating circuit controlled by the signals generated from the signal coil, and a comparator for comparing a integral signal supplied from the integrating circuit with a reference signal. Comparison between the integral signal and the reference signal leads to advance characteristics or delay characteristics. Accordingly, the conventional system exhibits desired advance characteristics and delay characteristics by adjusting an integration constant of the intregating circuit.

However, the conventional ignition system of the electronic control type is complicated in its circuit structure and increased in manufacturing costs because of requiring the integrating circuit for operation of the ignition position and a control circuit for controlling the integrating circuit. Accordingly, the ignition system is not applied to an engine of which costs are desired to be reduced or restrained. Also, it is required that the signal coil generates signals at the maximum advanced position and minimum advanced position, therefore, a coil which is arranged in a usual magneto mounted at an engine cannot be used as the signal coil. This needs to arrange a separate signal generator, resulting in a further increase in costs of the ignition system.

SUMMARY OF THE INVENTION

The present invention has been made in view of the foregoing disadvantages of the prior art.

Accordingly, it is an object of the present invention to provide an ignition system for an internal combustion engine which is capable of accurately exhibiting advance characteristics of permitting an ignition position of the engine to be advanced in low and middle rotational speed regions and to be delayed in a high rotational speed region.

It is another object of the present invention to provide an ignition system for an internal combustion engine which is capable of using a generating coil arranged in a magneto as a signal coil.

It is a further object of the present invention to provide an ignition system for an internal combustion engine which is capable of readily detecting that a rotational speed of an internal combustion engine enters a delay rotation region.

It is still another object of the present invention to provide an ignition system for an internal combustion engine which is capable of accomplishing the above-described objects with a simple structure.

In accordance with the present invention, an ignition system for an internal combustion engine is provided. The ignition system generally includes an ignition voltage generating circuit, a signal coil, and a trigger circuit. The ignition voltage generating circuit is adapted to operate a semiconductor switch to quickly vary a primary current of an ignition coil to induce a high voltage across a secondary coil of the ignition coil. The signal coil generates an AC signal in synchronism with rotation of the internal combustion engine. The AC signal has a wave height increased with an increase in a rotational speed of the engine. The trigger circuit receives the output signal of the signal coil and generates a trigger signal which is supplied to the semiconductor switch to operate it at an ignition position of the engine.

The trigger circuit includes a delay rotation region setting circuit, a reference signal generating circuit and a trigger signal generating circuit. The delay rotation region setting circuit is supplied with the output signal of the signal coil and generates a delay region signal when it detects, depending on the output signal f the signal coil, that the rotational speed of the engine reaches a delay rotation region. In the delay rotation region, the ignition position is delayed with an increase in the rotational speed. The reference signal generating circuit is supplied with the delay region signal and generates a reference signal. When the delay region signal is not generated, the reference signal is kept at a constant level. The level of the reference signal is raised with an increase in the rotational speed of the engine while the delay region signal is being generated. The trigger signal generating circuit is supplied with the output signal of the signal coil and the reference signal and generates the trigger signal when the output signal exceed the reference signal.

In the present invention constructed as described above, the level of the reference signal is kept constant in a rotation region of a rotational speed lower than the delay rotation region. Accordingly, a position at which a level of the output signal of the signal coil exceed the level of the reference signal is advanced with an increase in the level of the output signal to lead to advance of the ignition position. When the rotational speed of the engine enters the delay rotation region, the level of the reference signal is raised with an increase in the rotational speed of the engine. This causes the position at which the level of the output signal of the signal coil exceeds that of the reference signal to be delayed with an increase in the rotational speed, resulting in delay characteristics.

Thus, the present invention eliminates arrangement of an integrating circuit for operating the ignition position, so that arrangement of a control circuit for controlling the integrating circuit may be eliminated. Accordingly, the ignition system of the present invention is significantly simplified in its circuit structure and substantially decreased in the manufacturing costs. Also, in the present invention, it is not required that the signal coil generates signals at its maximum advanced position and minimum advanced position, and the signal coil is merely required to generate positive and negative signals of a predetermined width. This permits a generating coil provided at an engine to be used as the signal coil.

BRIEF DESCRIPTION OF THE DRAWINGS

These and other objects and many of the attendant advantages of the present invention will be readily appreciated as the same becomes better understood by reference to the following detailed description when considered in connection with the accompanying drawings in while like reference characters designate like or corresponding parts throughout; wherein:

FIGS. 6(A-G) are a timing chart showing operation of the trigger circuit of FIG. 5 when a rotational speed N is in a range of $N_2$ N $N_3$;

DETAILED DESCRIPTION OF THE PREFERRED EMBODIMENT

Now, an ignition system for an internal combustion engine according to the present invention will be described hereinafter with reference to the accompanying drawings.

Figure 1:
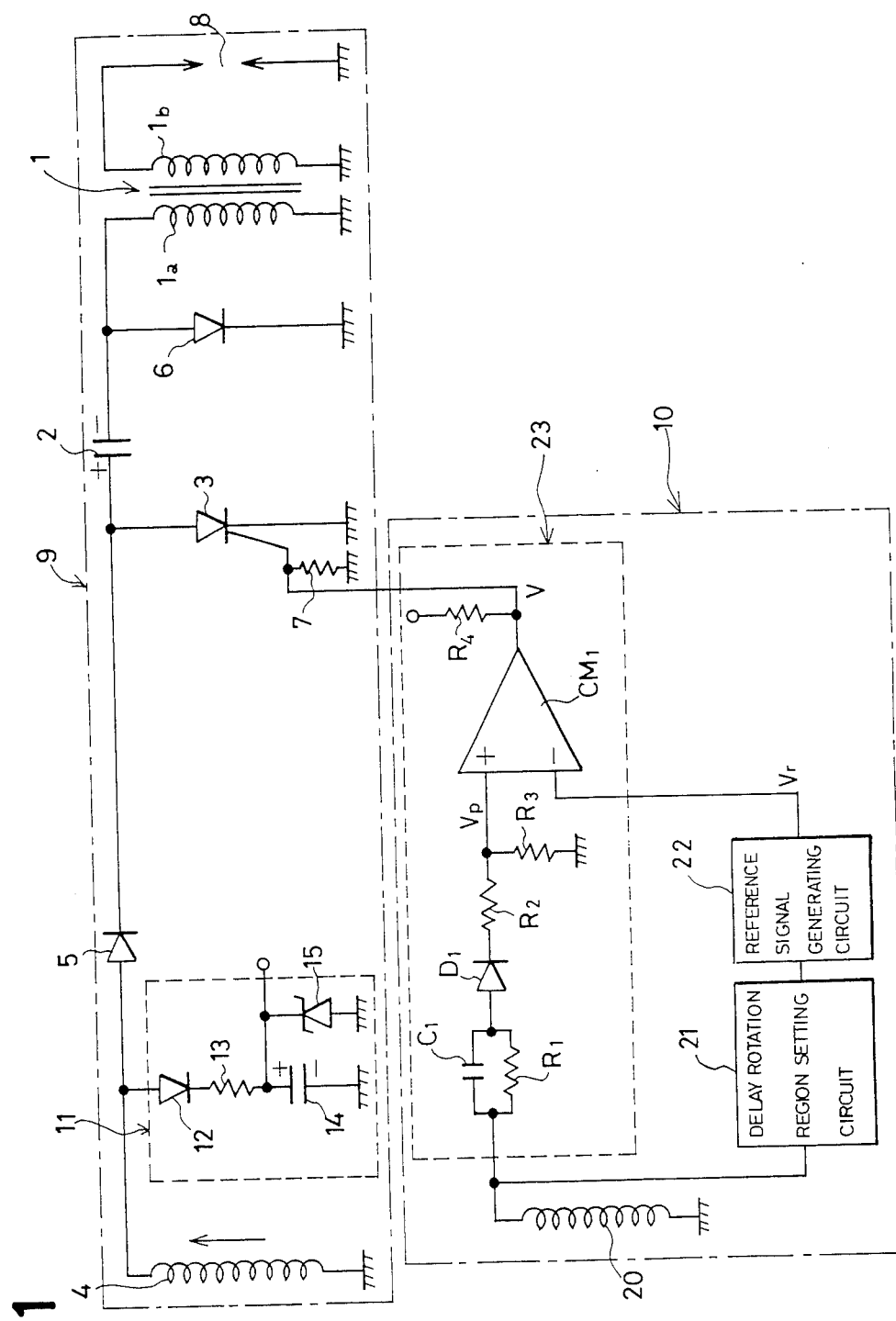
FIG. 1 is a circuit diagram showing an embodiment of an ignition system for an internal combustion engine according to the present invention.

FIG. 1 shows an embodiment of an ignition system for an internal combustion engine according to the present invention. An ignition system of the illustrated embodiment includes an ignition coil 1 including a primary coil 1a and a secondary coil 1b, a capacitor 2 for accumulating therein ignition energy which is arranged on the primary side of the ignition coil 1, a discharge control thyristor 3 arranged so as to discharge charge from the capacitor 2 to the primary coil 1a when it is turned on, and an exciter coil 4 provided in a magneto driven by an internal combustion engine. The ignition system also includes a diode 5 arranged between the exciter coil 4 and the capacitor 2 so as to rectify an output of the exciter coil 4 to flow a charge current through the capacitor 2, a diode 6 connected across the primary coil 1a, a resistor 7 connected between a gate of the thyristor 3 and its cathode, and an ignition plug 8 mounted on a cylinder of the engine and connected to the secondary coil 1b of the ignition coil 1.

The above-described elements 1 to 8 constitute an ignition voltage generating circuit 9 of the capacitor charge-discharge type which is known in the at.

A circuit arranged in a framework of chain lines indicating the ignition voltage generating circuit 9 and generally designated at reference numeral 11 in FIG. 1 is a power circuit which utilizes the output of the exciter coil 4 to supply a power supply voltage to a trigger circuit 10. The power circuit 11 includes a diode 12, a resistor 13, a power capacitor 14 and a Zener diode 15. In the power circuit 11, the capacitor 14 is charged through the diode 12 and resistor 13 by one polarity half cycle of the output voltage of the exciter coil 4. A voltage across the capacitor 14 is kept substantially constant by the Zener diode 15 and applied to a power terminal of the trigger circuit 10.

The trigger circuit 10 includes a signal coil 20 provided together with the exciter coil 4 in the magneto mounted at the internal combustion engine, a delay rotation region setting circuit 21 for setting a rotation region in which an ignition position of the engine is delayed, a reference signal generating circuit 22, and a trigger signal generating circuit 23. The delay rotation region setting circuit 21 is supplied with an output of the signal coil 20 and generates a delay region indicating signal for indicating that the rotational speed of the engine enters a region in which the ignition position is delayed with an increase in the rotational speed. The reference signal generating circuit 22 generates a reference signal Vr of a constant level when the delay region indicating signal is not supplied from the delay rotation region setting circuit 21 thereto and a reference signal Vr of which a level is raised depending on the rotational speed of the engine while the delay region indicating signal is being supplied thereto. The trigger signal generating circuit 23 includes resistors R1-R4, a capacitor C1, a diode D1 and a comparator CM1. When comparison between the output of the signal coil 20 and the reference signal Vr by the comparator CM1 determines that a level of the output exceeds that of the reference signal Vr, the circuit 23 produces a trigger signal Vt.

Figure 8:
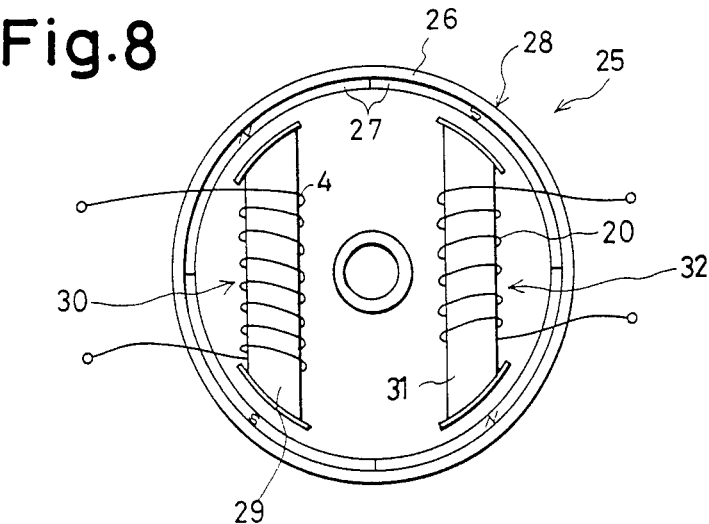
FIG. 8 is a schematic front elevation view showing an example of a magneto used in the present invention.

The magneto 25 in which the exciter coil 4 and signal coil 20 are arranged may be constructed as exemplified in FIG. 8. The magneto 25 of FIG. 8 includes a four-pole flywheel magneto rotor 28 comprising a flywheel 26 of a cup-like shape mounted on an output shaft of the engine and four permanent magnets 27 arranged on an inner periphery of the flywheel 26, an armature 30 comprising the exciter coil 4 wound on an I-shaped core 29, and an armature 32 comprising the signal coil 20 wound on a core 31. The armatures 30 and 32 are symmetrically arranged at positions spaced at an angular interval of 180 degrees from each other and fixed on a stator mounting portion of a casing of the engine, its cover or the like.

In the ignition system of the illustrated embodiment constructed as described above, when a voltage of a one polarity half cycle is induced across the exciter coil 4 of the ignition voltage generating circuit 9 as indicated at an arrow in FIG. 1, the capacitor 2 is charged into such a polarity as indicated in FIG. 1 through a circuit from the exciter coil 4 via the diode 5, capacitor 2 and diode 6 to the exciter coil 4. Supply of a trigger signal from the trigger circuit 10 to the gate of the thyristor 3 leads to turning-on of the thyristor 3, resulting in discharge from the capacitor 2 through the thyristor 3 and primary coil 1a. This causes a variation of magnetic flux to substantially occur in a core of the ignition coil 1, so that a high voltage for ignition may be induced across the secondary coil 1b. The high voltage is supplied to the ignition plug 8, at which a spark occurs for ignition of the engine.

Figure 4A:
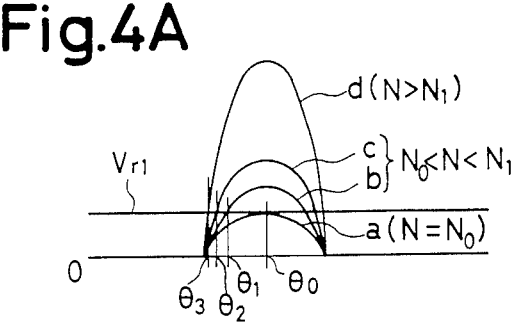
FIGS. 4A and 4B each are a signal waveform chart showing operation of a trigger signal generating circuit.
Figure 7:
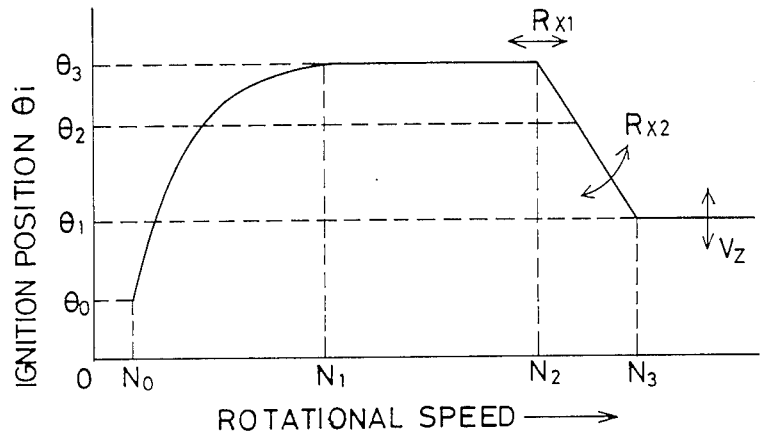
FIG. 7 is a diagram showing an example of ignition characteristics which a ignition system of the present invention exhibits.

A waveform of a signal supplied from the signal coil 20 to the comparator CM1 at an advance starting rotational speed No of the engine may be, for example, as indicated at reference character a in FIG. 4A. When a peak of the signal waveform a reaches a level Vrl of a reference signal Vr at an angle $\theta o$, a trigger signal Vt is supplied from the comparator CM1 to the thyristor 3. When the rotational speed N of the engine is above the advance starting rotational speed No and below an advance terminating rotational speed N1 (No<N≦N1), the signal supplied from the signal coil 20 to the comparator CM1 is caused to have a waveform as indicated at b or c in FIG. 4A. At this time, the level Vrl of the reference signal Vr generated from the reference signal generating circuit 22 is kept at constant. Accordingly, an ignition position or a position at which the level of the output of the signal coil 20 exceeds the level Vrl of the reference signal Vr is advanced with an increase in the output of the signal coil 20. Thus, as shown in FIG. 7, in an advance region extending from the advance starting rotational speed No to the advance terminating rotational speed N1, the ignition position is advanced from $\theta o$ through $\theta 1$ to $\theta 2$ with an increase in the rotational speed of the engine.

When the rotational speed N of the engine exceeds the advance terminating rotational speed N1, the output of the signal coil 20 is substantially saturated, so that the signal supplied from the signal coil 20 to the comparator CM1 has a waveform as indicated at d in FIG. 4A. Thus, a position $\theta 3$ at which the output of the signal coil 20 exceed the level Vrl of the reference signal Vr is rendered constant, resulting in advance of the ignition position being stopped.

Figure 4B:
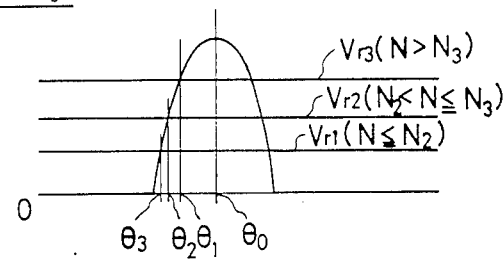

When the rotational speed of the engine is equal to or above the delay starting rotational speed N2, the level of the reference signal Vr is raised from Vrl via Vr2 to Vr3 with an increase in the rotational speed as shown in FIG. 4B. When the rotational speed of the engine is equal to or above the delay starting rotational speed N2, a peak of a waveform of the output of the signal coil 20 is kept substantially constant because the output is already saturated. As the level of the reference signal vr is raised from Vrl through Vr2 to Vr3 under such conditions, the ignition position is delayed as indicated at $\theta 3 \rightarrow \theta 2 \rightarrow \theta 1$.

When the rotational speed exceeds a delay terminating rotational speed N3, raising of the level of the reference signal Vr is stopped, so that the ignition position is fixed at $\theta 1$. Thus, it will be noted that the ignition system of the illustrated embodiment exhibits characteristics that the ignition position is advanced in a region between the rotational speeds No and N1, kept at constant in a region between the rotational speeds N1 and N2 and delayed in a region between the rotational speed N2 and N3.

In the illustrated embodiment, the ignition voltage generating circuit 9 is not limited to any specific circuit as far as it controls a primary current flowing through the ignition coil by operation of a semiconductor switch to produce a high voltage for ignition. For example, as the circuit 9 may be used an ignition voltage generating circuit of the current-interruption type which is adapted to change a semiconductor switch such as a transistor or the like arranged on the primary side of the ignition coil from a turned-on state to a turned-off state to raise a voltage induced across the primary coil of the ignition coil by the secondary coil.

Figure 2:
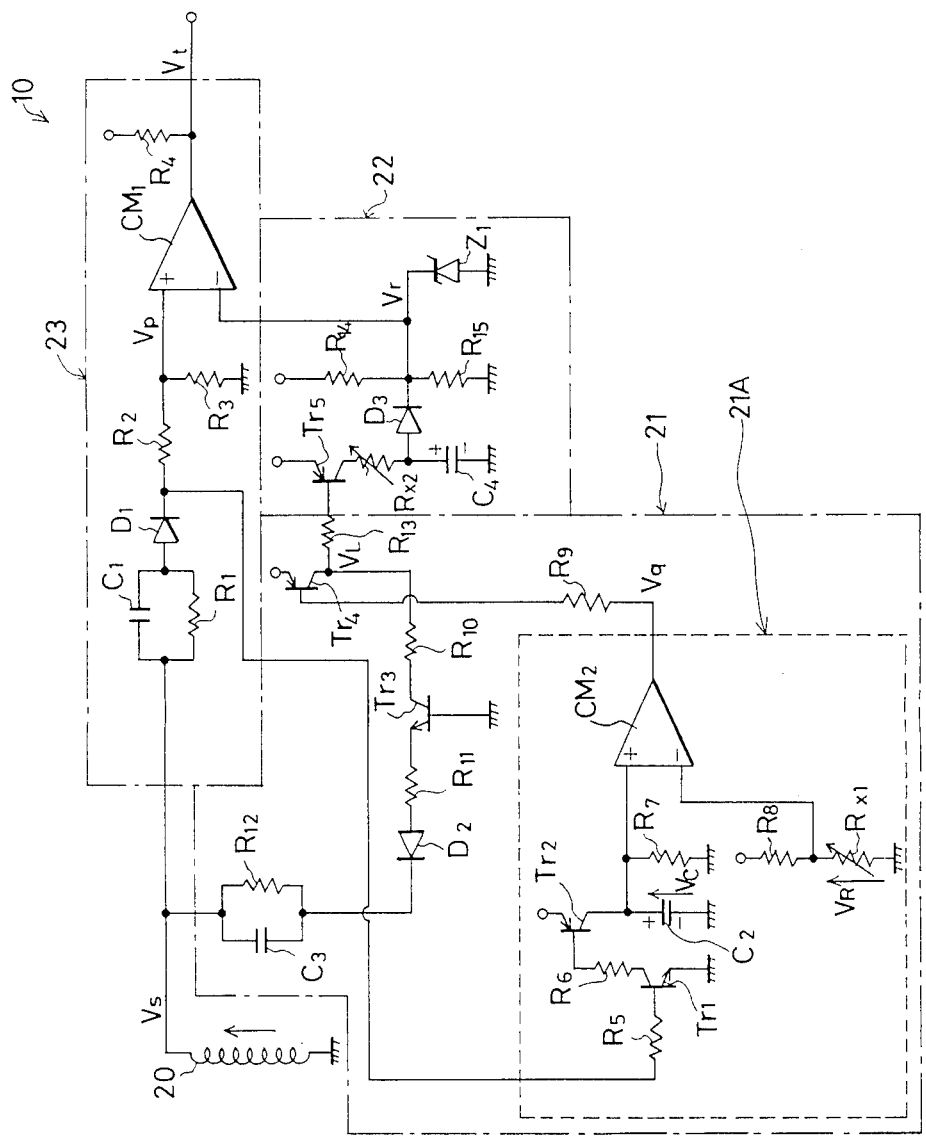
FIG. 2 is a circuit diagram showing an example of a trigger circuit used in the ignition system of FIG. 1.

Now, the trigger circuit 10 may be constructed as shown in FIG. 2. In a trigger circuit 10 shown in FIG. 2, a trigger signal generating circuit 23 is constructed in the same manner as that shown in FIG. 1. A delay rotation region setting circuit 21 includes a monostable multivibrator 21A comprising resistors R5-R8, a variable resistor Rx1, transistors Tr1 and Tr2, a capacitor C2 and a comparator CM2; resistors R9-R13; a capacitor C3; a diode D2; and transistors Tr3 and Tr4. A reference signal generating circuit 22 includes resistors R14 and R15, a variable resistor R×2, a transistor Tr5, a capacitor C4, a diode D3, and a Zener diode Z1.

Figure 3:
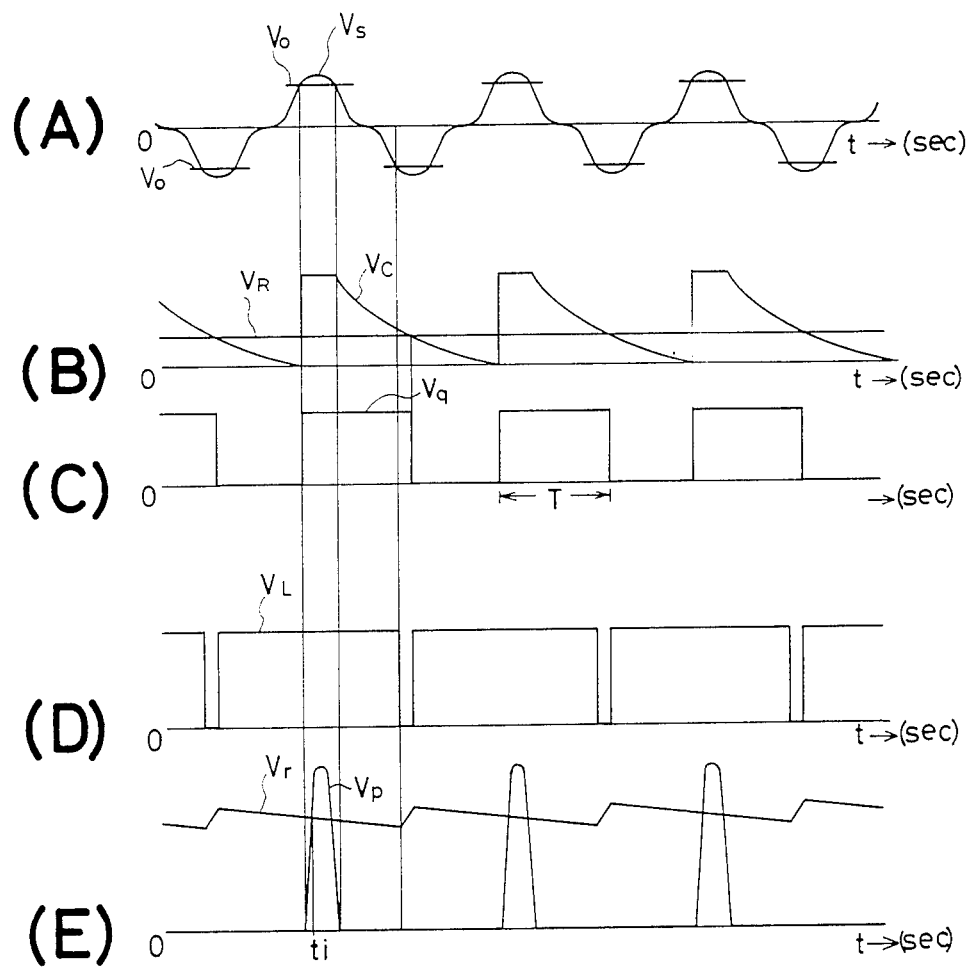
FIGS. 3(A-E) are a timing chart showing operation of the trigger circuit of FIG. 2 when a rotational speed N is in a range of $N_2$ N $N_3$.

In the trigger circuit 10 constructed as described above, a signal coil 20 generates signals Vs in synchronism with rotation of the engine as indicated at (A) in FIG. 3. More particularly, the signal coil 20 generates signals Vs of such a polarity as indicated at an arrow in FIG. 2 (positive signals). When the signal Vs exceeds a predetermined threshold level Vo, a base current is caused to flow through bases of the transistors Tr1 and Tr2 to turn on them. This results in the capacitor C2 being charged into a polarity shown in FIG. 1 through the transistor Tr2 by an output voltage of the power circuit 11. When the output signal Vs of the signal coil 20 falls below the threshold level Vo, the transistors Tr1 and Tr2 are turned off. This leads to discharge from the capacitor C2 through the resistor R7 at a predetermined time constant. A voltage Vc across the capacitor C2 is as indicated at (B) in FIG. 3. The comparator CM2 receives the voltage Vc across the capacitor C2 and a reference voltage VR obtained by dividing the output voltage of the source circuit 11 by means of a dividing circuit comprising a series circuit of the resistor R8 and the variable resistor Rx1. For a period of time during which the voltage Vc across the capacitor C2 exceeds the reference voltage VR, a potential at an output terminal of the comparator CM2 is maintained at a high level. When a predetermined period of time T elapses after the capacitor C2 is charged and the voltage Vc across the capacitor C2 is equal to or below the reference voltage Vr, the potential at the output terminal of the comparator CM2 is rendered substantially zero. Accordingly, the comparator CM2 generates a rectangular signal Vq of a given time width as indicated at (C) in FIG. 3. The transistor Tr4 is kept nonconductive for a period of time during which the rectangular signal vq is generated. While the transistors Tr3 and Tr4 are maintained conductive, the transistor Tr5 is prevented from being turned on. While the transistor Tr4 is maintained non-conductive, turning-on of the transistor Tr3 causes the transistor Tr5 to be turned on.

While the signal coil 20 continues to generate the positive signal Vs, a base current does not flow through a base of the transistor Tr3. This causes the transistor Tr3 to be kept non-conductive and the transistor Tr5 to be kept non-conductive as well. When the signal coil 20 generates a negative signal Vs, a base current flows through the transistor Tr3 for only a short period of time through a base-emitter circuit of the transistor Tr3, the resistor R11, the diode D2 and the capacitor C3. At this time, when the transistor Tr4 is in a non-conductive state, the transistors Tr3 and Tr5 are turned on. When the rotational speed N is below the delay starting rotational speed N2, the rectangular signal Vq extinguishes already when the signal coil 20 generates the negative signal Vs. This leads to turning-on of the transistors Tr3 and Tr4 to cause a base and an emitter of the transistor Tr5 to be at the same voltage level, so that the transistor Tr5 is prevented from being turned on. Accordingly, even when the signal coil 20 generates the negative signal Vs to cause the transistor Tr3 to be turned on, the transistor Tr5 is not turned on. Thus, when the rotational speed is below the delay starting rotational speed N2, the transistor Tr5 is kept at nonconductive, so that the capacitor C4 is not charged. At this time, the reference signal generating circuit 22 generates the reference signal Vr of a constant level obtained by dividing the output voltage from the power circuit by means of a dividing circuit comprising a series circuit of the resistors R14 and R15.

When the rotational speed exceeds the delay starting rotational speed N2, the signal coil 20 generates the negative signal Vs while the rectangular signal Vq is being generated, because a cycle of the signal is shortened. Accordingly, when the signal Vs exceeds the level Vo to cause the transistor Tr3 to be conductive, the transistor Tr4 is kept non-conductive, resulting in the transistor Tr5 being turned on. At this time, a waveform of a potential (delay angle rotation region setting signal) vL of a collector of the transistor Tr4 is as indicated at (D) in FIG. 3. The transistor Tr5 is maintained conductive for a period of time during which the signal VL is kept at a low level. When the transistor Tr5 is turned on, the capacitor C4 is charged with the output voltage of the power circuit 11. A voltage across the so-charged capacitor C4 is supplied as the reference signal Vr from the reference signal generating circuit 22. A period during which the transistor Tr5 is maintained conductive is lengthened with an increase in the rotational speed of the engine, so that the voltage across the capacitor C4 is increased with an increase in the rotational speed. When the rotational speed reaches the delay terminating rotational speed N3, the voltage across the capacitor C4 reaches a Zener voltage of the Zener diode Z1. Thereafter, the voltage across the capacitor C4 is rendered equal to the Zener voltage. Thus, the trigger circuit shown in FIG. 2 permits the reference voltage Vr to be maintained at a constant level in a rotation region below the delay starting rotational speed N2, to be raised with an increase in the rotational speed in the delay starting rotation region (N2≦N<N3) and to be rendered at the constant level in a rotation region equal to or above the delay terminating rotational speed N3.

The trigger signal generating circuit 23 compares a pulse signal Vp obtained by differentiating the positive signal Vs (see (E) in FIG. 3) of the signal coil 20 by a differentiating circuit comprising the capacitor C1 and resistors R2 and R3 with the reference signal vr described above and generates a trigger signal Vt when the pulse signal Vp exceeds the reference signal Vr at a time ti. The so-generated trigger signal Vt causes a semiconductor switch of the ignition voltage generating circuit which corresponds to the thyristor 3 in the embodiment of FIG. 1 to be triggered. This leads to ignition characteristics shown in FIG. 7. In the illustrated embodiment, adjustment of a resistance of the variable resistor R×1 may cause the delay starting rotational speed N2 to be adjusted. Also, the adjustment of a resistance of the variable resistor R×2 may lead to adjustment of an inclination of delay characteristics. Further, a variation of the Zener voltage of the Zener diode Z1 permits the ignition position θ1 after termination of the delay to be adjusted.

Figure 5:
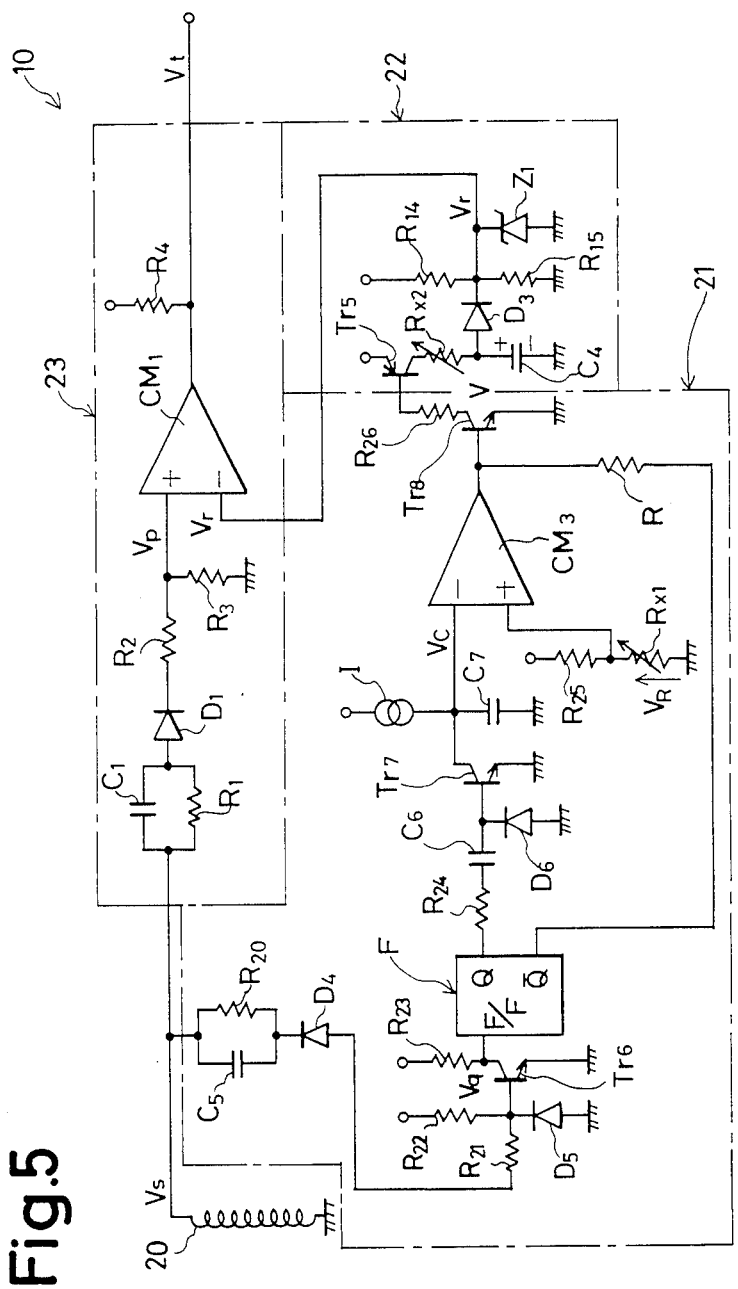
FIG. 5 is a circuit diagram showing another example of a trigger circuit.

FIG. 5 shows another example of the trigger circuit 10. In a trigger circuit of FIG. 5, a delay angle rotation region setting circuit 21 comprises resistors R20-R27, a variable resistor Rx1, transistors Tr6-Tr8, diodes D4-D6, a flip-flop circuit F, capacitors C5-C7, a constant-current circuit I and a comparator CM3. The remaining of the trigger circuit 10 of FIG. 5 may be constructed in the same manner as that of FIG. 2.

FIG. 6 are a timing chart of the so-constructed trigger circuit shown in FIG. 5. In FIG. 6, (A) to (G) indicate waveforms of an output Vs of a signal coil 20, a flip-flop trigger signal Vg produced at a collector of the transistor Tr6, a positive logic output signal Q of the flip-flop circuit F, a negative logic output signal $\overline{Q}$ of the flip-flop circuit F, a voltage Vc across the capacitor C7 and a reference voltage VR, a voltage VL at a collector of the transistor Tr8 (output of delay angle rotation region setting circuit), and a signal Vp and a reference signal Vr, respectively.

In the trigger circuit shown in FIG. 5, the diode D5 is turned on every time when the negative output signal Vs of the signal coil 20 is equal to or higher than a threshold level Vo. This causes a base-emitter circuit of the transistor Tr to be invertedly biased to render the transistor Tr6 turned off, so that the flip-flop trigger signal Vg of a pulse-like shape indicated at (B) in FIG. 6 may be produced at the collector of the transistor Tr6. A stable state of the flip-flop circuit F is inverted every time when the trigger signal Vg is supplied to the flip-flop circuit F. The flip-flop circuit F generate a positive logic output signal Q and a negative logic output signal $\overline{Q}$ as indicated at (C) and (D) in FIG. 6, respectively.

The positive logic output signal Q is then supplied through the capacitor C6 to a base of the transistor Tr7. The transistor Tr7 is instantaneously turned on to cause the capacitor C7 to discharge when the positive logic output signal Q rises. As indicated at (E) in FIG. 6, the constant-current circuit I causes the capacitor C7 to be charged after the transistor Tr7 is turned off, resulting in the voltage Vc across the capacitor C7 being linearly increased.

Now, the manner of operation of the ignition system of the illustrated embodiment when the rotational speed of the engine is below the delay starting rotational speed N2 will be described.

The voltage Vc across the capacitor C7 is maintained above the reference voltage VR across the variable resistor R×1 while the negative logic output signal $\overline{Q}$ of the flip-flop circuit F is kept at a low level. A potential at an output terminal of the comparator CM3 is kept at zero for a period of time during which the voltage Vc is maintained above the voltage VR. Accordingly, when the rotational speed N is below the delay starting rotational speed N2, the transistor Tr8 cannot be turned on.

Next, the manner of operation of the ignition system when the rotational speed is equal to or above the delay starting rotational speed N2 will be described hereinafter.

The voltage Vc across the capacitor C7 exceeds the reference voltage VR after the negative logic output signal $\overline{Q}$ is raised to a high level. The output of the comparator CM 3 is still maintained at a high level at the time when the negative logic output signal of the flip-flop circuit F rises. Accordingly, the transistor Tr8 is turned on for a period of time extending from rising of the negative logic output signal $\overline{Q}$ to transfer of the output of the comparator CM3 to a low level. The delay rotation region setting signal VL produced at the collector of the transistor Tr8, as described above, has such a waveform as indicated at (F) in FIG. 6. The transistor Tr5 is maintained conductive to cause the capacitor C4 to be charged while the setting signal VL is kept at a low level or the transistor Tr8 is kept conductive. A period of time during which the transistor is maintained conductive is lengthened as the rotational speed of the engine is increased, therefore, the voltage across the capacitor C4 is increased with an increase in the rotational speed. Accordingly, the reference signal Vr is rendered constant when the rotational speed N is below the delay starting rotational speed (N<N2) and increased corresponding to an increase in the rotational speed in the delay rotation region (N2≦N <N3). When the rotational speed is in the delay terminating rotation region (N3= <N), the voltage across the capacitor C4 is restricted by the Zener diode Z1, to thereby cause the reference signal Vr to be constant.

As can be seen from the foregoing, the present invention is constructed so as to produce the reference signal of which a level is rendered constant when the rotational speed of the engine is in a rotation region below the delay starting rotational speed and raised corresponding to an increase in the rotational speed in the delay rotation region, so that the trigger signal may be generated when an output of the signal coil exceeds a level of the reference signal. Such construction permits advance and delay characteristics to be obtained without arrangement of a complicated integrating circuit, to thereby significantly simplify the circuit structure of the ignition system. Also, in the present invention, the signal coil is merely required to generate the positive and negative signals of a predetermined width and therefore eliminates a necessity of generating signals at the maximum advanced position and minimum advanced position. Accordingly, in the present invention, a generating coil arranged in a magneto of an engine may be used as the signal coil, resulting in the circuit being further simplified and costs for the ignition system being significantly reduced.

While a preferred embodiment of the invention has been described with a certain degree of particularity with reference to the drawings, obvious modifications and variations are possible in the light of the above teachings. It is therefore to be understood that within the scope of the appended claims, the invention may be practiced otherwise than as specifically described.

What is claimed is:

1. An ignition system for an internal combustion engine comprising:

an ignition voltage generating circuit for inducing a high voltage across a secondary coil of an ignition coil by operating a semiconductor switch to quickly vary a primary current of said ignition coil;

a signal coil for generating an AC signal in synchronism with rotation of the engine, said AC signal having a wave height increased with an increase in a rotational speed of the engine; and a trigger circuit for receiving the output signal of said signal coil and generating a trigger signal which is supplied to said semiconductor switch to operate it at an ignition position of the engine;

said trigger circuit comprising a delay rotation region setting circuit for receiving the output signal of said signal coil and generating a delay region signal when it detects, depending on the output signal, that the rotational speed of the engine reaches a delay rotation region in which the ignition position is delayed with an increase in the rotational speed;

a reference signal generating circuit for receiving the delay region signal and generating a reference signal, a level of said reference signal being kept constant when the delay region signal is not generated and raised with an increase in the rotational speed of the engine for a period of time during which the delay region signal is generated; and a trigger signal generating circuit supplied with the output signal of said signal coil and the reference signal to generate the trigger signal when the output signal exceeds the reference signal.

2. An ignition system as defined in claim 1, wherein said delay rotation region setting circuit comprises switch means which is maintained conductive for a period of time during which one polarity half cycle output Vs of said signal coil exceeds a predetermined threshold level Vo;

a capacitor charged through the switch means;

a reference voltage generating circuit for generating a reference voltage VR;

a comparator for comparing a voltage vc across said capacitor with said reference voltage VR, said comparator generating a signal Vq for a predetermined period of time when it detects that said voltage Vc exceeds said reference voltage VR; and a signal generating circuit for generating said delay region signal for a period of time during which the other polarity half cycle output of said signal coil exceeds said threshold level while said signal Vq is being generated.

3. An ignition system as defined in claim 1, wherein said delay rotation region setting circuit comprises a flip-flop circuit of which a stable state is inverted every time when one half cycle output of said signal coil exceeds said predetermined threshold level Vo;

a capacitor C7 charged by a constant current circuit I;

a capacitor discharge circuit for discharging said capacitor C7 when one logic output signal is generated from said flip-flop circuit;

a reference signal generating circuit for generating a reference signal VR;

a comparator for comparing a voltage Vc across said capacitor with said reference signal VR, said comparator generating a comparison signal for a period of time during which said voltage Vc exceeds said reference signal VR;

switch means turned on by said comparison signal to generate said delay region signal; and a signal block circuit for preventing said comparison signal from being supplied to said switch means for a period of time during which the other logic output signal is generated from said flip-flop circuit.

4. An ignition system as defined in claim 2 or 3, wherein said reference signal generating circuit comprises a transistor switch which is maintained conductive for a period of time during which said delay region signal is generated;

a capacitor C4 charged with an output of a power circuit through said transistor switch;

a discharge circuit for discharging said capacitor while said transistor is maintained non-conductive;

voltage restricting means for restricting an increase in said voltage across said capacitor C4; and a constant-voltage generating circuit for generating a constant voltage;

said voltage across said capacitor and said constant voltage being used as said reference signal.

* * * * *